(12) United States Patent
Liu et al.

(10) Patent No.: US 12,517,850 B1
(45) Date of Patent: Jan. 6, 2026

(54) INTERPOSER ROUTING FOR UNIVERSAL CHIPLET INTERCONNECT EXPRESS™ CHANNELS BY PARTITIONING INTO SUBCHANNELS

(71) Applicant: Synopsys, Inc., Sunnyvale, CA (US)

(72) Inventors: Xun Liu, Cary, NC (US); Jennifer Song Yon Pyon, Saratoga, CA (US)

(73) Assignee: Synopsys, Inc., Sunnyvale, CA (US)

( * ) Notice: Subject to any disclaimer, the term of this patent is extended or adjusted under 35 U.S.C. 154(b) by 142 days.

(21) Appl. No.: 18/460,568

(22) Filed: Sep. 3, 2023

(51) Int. Cl.
*G06F 13/38* (2006.01)

(52) U.S. Cl.
CPC ........ *G06F 13/382* (2013.01); *G06F 2213/40* (2013.01)

(58) Field of Classification Search
CPC ...... G06F 13/382; G06F 13/38; G06F 13/364; G06F 2213/40
See application file for complete search history.

(56) References Cited

U.S. PATENT DOCUMENTS

| | | | | |
|---|---|---|---|---|
| 10,867,106 | B1* | 12/2020 | Gupta | G06F 30/3953 |
| 11,855,043 | B1* | 12/2023 | Farjadrad | H01L 25/0655 |
| 12,248,419 | B1* | 3/2025 | Farjadrad | G06F 13/382 |
| 2022/0222198 | A1* | 7/2022 | Lanka | G06F 13/4273 |
| 2023/0061120 | A1 | 3/2023 | Liu et al. | |

* cited by examiner

*Primary Examiner* — Raymond N Phan
(74) *Attorney, Agent, or Firm* — Fenwick & West LLP

(57) ABSTRACT

A description of an interconnect channel within an interposer (such as a Universal Chiplet Interconnect Express™ (UCIe) channel) includes first bump locations for a first interface to the interconnect channel on a first die, second bump locations for a second interface to the interconnect channel on a second die, and nets connecting corresponding first and second bump locations for the two interfaces on the two dies. A processing device partitions the interconnect channel into subchannels. The subchannels include corresponding clusters of first and second bump locations connected by nets. The bounding boxes for the subchannels are non-overlapping. For each subchannel, the nets within the subchannel are routed.

18 Claims, 8 Drawing Sheets

INTERPOSER ROUTING FOR UNIVERSAL CHIPLET INTERCONNECT EXPRESS™ CHANNELS BY PARTITIONING INTO SUBCHANNELS

TECHNICAL FIELD

The present disclosure relates to routing of interconnects on an interposer, for example for a Universal Chiplet Interconnect Express™ (UCIe) channel.

BACKGROUND

With the ever-increasing complexity of integrated circuits (ICs) and the miniaturization of on-chip devices, individual dies that contain all the functionality of a desired system have become more difficult and more expensive to manufacture. Three-dimensional IC (3DIC) packaging technology is a promising solution. In a 3DIC system, multiple dies are assembled in a single package.

In one approach, a passive interposer die supports multiple other dies with active circuitry. The interposer also provides inter-die communications channels. Signals propagate from one die through the interposer to another die, and vice versa. Universal Chiplet Interconnect Express™ (UCIe) is one standard for inter-die data communication. However, given the high-speed requirements of modern systems and the distances between separate dies, it can be challenging to route these signals through the interposer.

SUMMARY

In some aspects, a description of an interconnect channel within an interposer (such as a Universal Chiplet Interconnect Express™ (UCIe) channel) includes first bump locations for a first interface to the interconnect channel on a first die, second bump locations for a second interface to the interconnect channel on a second die, and nets connecting corresponding first and second bump locations for the two interfaces on the two dies. A processing device partitions the interconnect channel into subchannels. The subchannels include corresponding clusters of first and second bump locations connected by nets. The bounding boxes for the subchannels are non-overlapping. For each subchannel, the nets within the subchannel are routed.

In another aspect, an integrated circuit system includes a first die, a second die, and an interposer supporting the two dies. Each of the two dies includes an interface, and the interposer contains an interconnect channel (such as a UCIe channel) connecting the two interfaces on the two dies. The interconnect channel on the interposer includes bump locations that connect to the two interfaces. The interposer also includes interconnects that connecting corresponding clusters of bump locations for the two interfaces on the two dies. The interconnect channel is partitioned into and laid out according to subchannels that contain corresponding clusters, where the bounding boxes for the subchannels are non-overlapping.

In yet another aspect, a description of an interconnect channel within an interposer (such as a UCIe channel) includes bump locations for a first interface on a first die, bump locations for a second interface on a second die, and nets connecting corresponding bump locations for the two interfaces on the two dies. The bump locations and nets for a main band of the interconnect channel and for a side band for the interconnect channel are identified. The nets for the main band and the nets for the side band are both routed as parts of a single flow for routing the interconnect channel, but using separate routing processes within the single flow.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
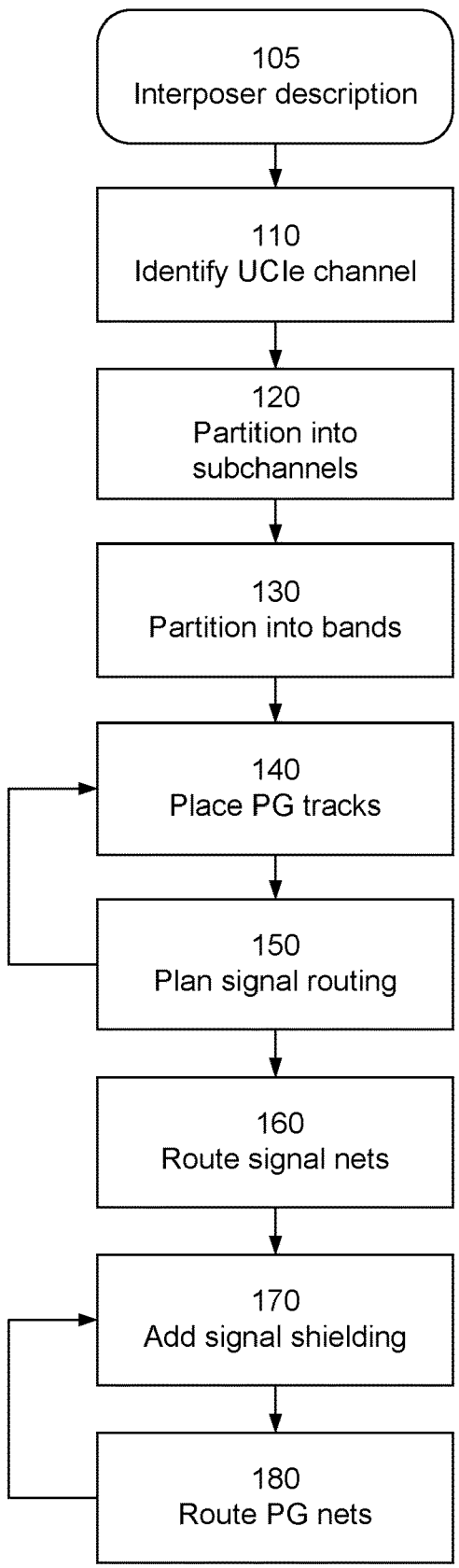
FIG. 1 is a flow diagram for routing a Universal Chiplet Interconnect Express™ (UCIe) channel through an interposer, in accordance with some embodiments of the present disclosure.

Aspects of the present disclosure relate to interposer routing for interconnect channels, such as Universal Chiplet Interconnect Express™ (UCIe) channels. In the present disclosure, UCIe is used as an example for purposes of illustration, but other interconnect channels may also be used. An interposer supports two dies, each of which contains a UCIe interface. The interposer includes interconnects that connect the two UCIe interfaces. Bumps on the interposer connect to the two UCIe interfaces. As described in more detail below, the interposer interconnects are routed to connect the bump locations for one die with the corresponding bump locations for the other die.

The demand for high-performance systems is ever increasing. It can be challenging to design and manufacture a single IC that implements all of the functionality desired for a particular application. An alternative is 3DICs, in which multiple die (chiplets) are packaged on an interposer die. UCIe is an example of a standard suited for inter-die data communications in 3DICs. UCIe defines an interface so that different vendors can independently design the different dies on the interposer using the standardized interface. The UCIe interface on one die is connected through the interposer to the UCIe interface on another die.

However, the UCIe standard presents challenges for the routing of the UCIe channel through the interposer. First, the data transfer rate is high, reaching 16 GHz. Second, the power efficiency is also high, in the range of 0.5 pJ/b to 0.25 pJ/b. As a result, data communication on the interposer may use low voltage to reduce power consumption. The combination of high operating speed and low voltage supply leads to high-quality signal integrity to ensure reliable data transfer. In addition, the two dies may be separated by a significant distance on the interposer, resulting in long interconnects. Moreover, the interposer may not contain active devices, so techniques such as buffer insertion cannot be used. As a result, it can be challenging to meet the UCIe timing, power and signal integrity requirements, and it is even more challenging to develop automated routing tools that meet these requirements.

In some aspects, the UCIe channel is routed through the interposer by partitioning the UCIe interconnects into subchannels and routing the interconnects on a subchannel-by-subchannel basis. Before routing, the UCIe channel is described by bump locations for the UCIe interface on one die and corresponding bump locations for the UCIe interface on another die. Nets specify which bump locations are connected to which other bump locations, but do not specify the routing of the physical interconnects on the interposer. The UCIe channel is divided into subchannels which are not physically overlapping on the interposer. As a result, the nets within each subchannel may be routed separately from the other subchannels, which simplifies the routing task while still providing a good result.

In other aspects, the bump locations and nets are identified as a signal main band of the UCIe channel, a signal side band of the UCIe channel, or power and ground (PG) for the UCIe interfaces. Rather than routing the two UCIe signal bands with all the other signal bands on the interposer and then routing the UCIe PG network with all the other PG distribution on the interposer, the UCIe interconnects are all routed together but using different routing processes. For example, the UCIe main band may be routed first and given highest priority since it has the most stringent timing requirements. After this, the UCIe side band may be routed. Routing of the UCIe PG network may be combined with the routing of the signal bands. For example, some basic structure of the PG network, such as tracks that form the backbone of a PG mesh, may be placed before routing all of the signal bands. However, the routing of the PG network may not be fully completed until after routing of the signal bands, with the final PG stubs routed within the structure of interconnects for the signal bands.

Technical advantages of the present disclosure include, but are not limited to, the following. The partitioning of the interconnect channel into subchannels allows for global planning of the routing, which increases the routing area utilization, but without requiring the concurrent routing of all signals as a single routing task. The joint routing of signals and power/ground also leads to more efficient use of the routing area. The formulation of the routing flow allows these tasks to be automated, which reduces the time required to complete the interposer design compared to manual routing. It can also improve the routing result in terms of timing, power and/or signal integrity. An automated routing tool can also check the interconnect design for possible user errors.

FIG. 1 is a flow diagram for routing a UCIe channel through an interposer, in accordance with some embodiments of the present disclosure. The entire flow of FIG. 1 will first be described, with a brief description of each individual task. This is followed by a more detailed description of each task. The flow begins with a description 105 of an interposer. The description includes bump locations and nets connecting the different bump locations. Some or all of these are used to implement a UCIe channel. At 110, the bump locations and nets implementing the UCIe channel are identified. If the UCIe channel is already identified, then task 110 may be skipped or may be adapted to verify or check that the identification is correct. At 120, the UCIe channel is partitioned into subchannels to facilitate automated routing of the different nets. Under the current standard, a UCIe channel can include multiple based elements called D-words. Each D-word can include up to 148 faster main band signals and 8 slower side band signals. Instead of routing 148 main band signals all at once, the main band may be partitioned into subchannels containing fewer signals. The signals within each subchannel are then routed, which is an easier routing problem to solve. At 130, the UCIe channel is also partitioned into the main band and the side band. The main band signals operate at higher speeds, so they have more stringent requirements on their routing.

The UCIe standard does not separate bumps for the power and ground (PG) structure from the bumps for the signals. The PG bumps and signal bumps may be interspersed on the interposer. As a result, it is important that PG routing and signal routing are performed together so that either one does not prevent the other from being completed. PG routing is divided into two parts. At 140, PG tracks are placed. PG tracks provide a base structure for power and ground distribution, but they are not the complete PG network. Additional interconnects, such as stubs connecting to the PG tracks, are also required. Later, at 180, PG routing will be completed. At 150, signal routing is planned. The PG tracks from 140 divide the routing area allocated to the UCIe channel into multiple non-overlapping regions, each of which can contain one or more subchannels. Signal route planning includes some initial steps in preparation for routing of the subchannels and may include some initial routing. At 160, routing of the signal nets is performed. Once routing of signal nets is completed, signal shielding is added at 170 and PG routing is completed at 180.

The tasks shown may be performed in different orders and may be performed iteratively. In FIG. 1, tasks 140 and 150 are adjusted in iterations, and tasks 170 and 180 are also adjusted in iterations. If any tasks fail or cannot be completed, an error may be reported. The user can then correct the cause of the failure.

Figure 2A:
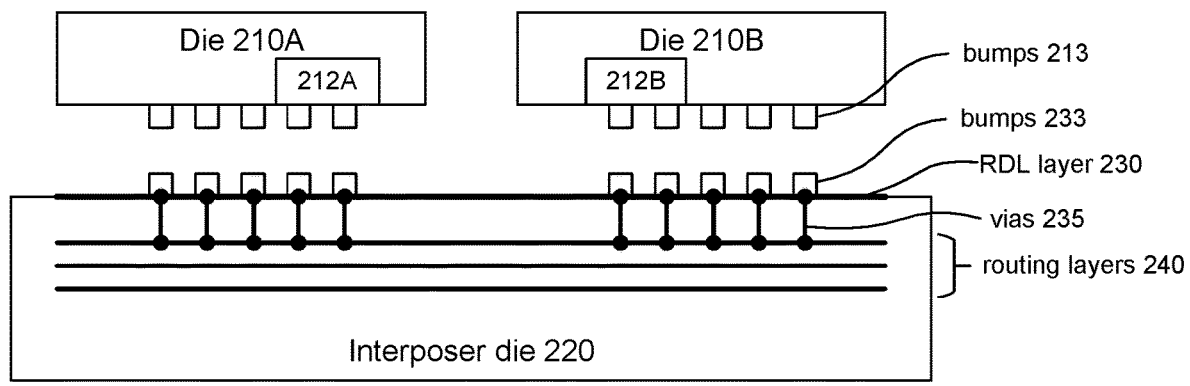
FIG. 2A is an exploded cross-sectional view of a 3DIC containing two dies interconnected through an interposer die, in accordance with some embodiments of the present disclosure.
Figure 2B:
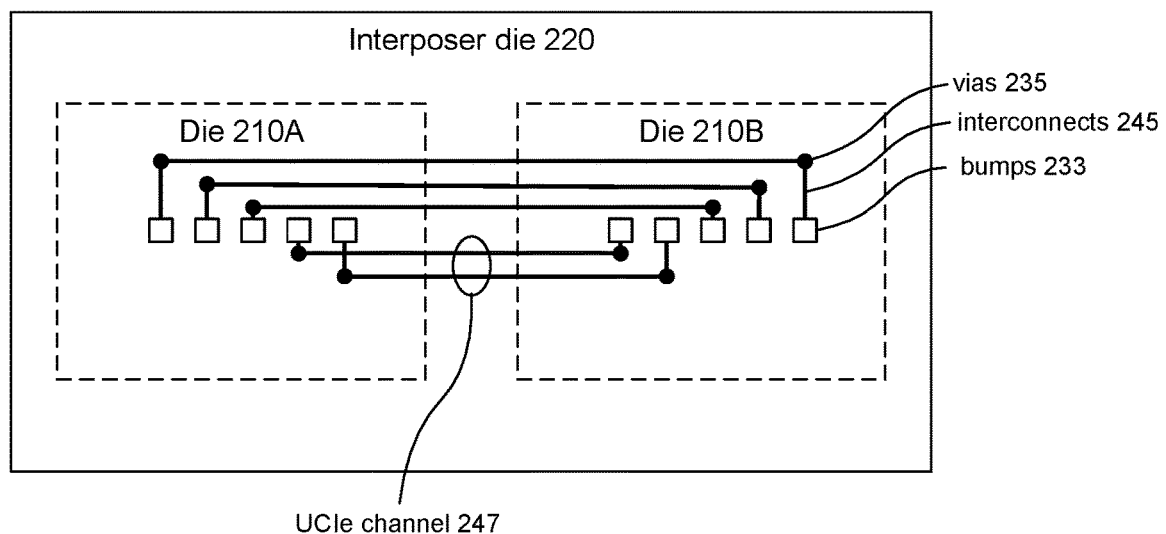
FIG. 2B is a top view of the interposer die of FIG. 2A, in accordance with some embodiments of the present disclosure.

FIGS. 2A and 2B show a physical 3DIC after routing. FIG. 2A is an exploded cross-sectional view of the 3DIC, and FIG. 2B is a top view of the interposer die of FIG. 2A. The 3DIC includes two die 210A,B and an interposer die 220. The two die 210A,B contain circuitry, including UCIe interfaces 212A,B. They may also contain other circuitry, such as high bandwidth memories, FPGAs, and processors. Various types of GPUs, CPUs, TPUs (tensor processing units), application processors, image processors, AI processors, image sensors and other types of circuitry may also be included in the dies 210. The bottom side of the interposer 220 may be used to connect to packaging (not shown).

In this example, the interposer 220 includes a redistribution layer (RDL layer) 230 and multiple routing layers 240. The RDL layer 230 contains "bumps" 233, which make electrical contact to corresponding bumps 213 on the dies 210. For convenience, all of these contacts will be referred to as "bumps," but they are not limited to bump technology. For example, the present disclosure may also be used with hybrid copper bonding technology, SoIC bridge type advanced packages, and other advanced package technologies. The terms "interposer" and "bump" are intended to include all of these alternatives. The location of the bumps 233 on the RDL layer are typically defined by the location of the corresponding bumps 213 on the dies 210. Vias 235 connect the top RDL layer 230 with the lower routing layers 240. Most of the interconnect routing occurs in the routing layers 240.

FIG. 2B shows the routing of interconnects 245 for nets connecting pairs of corresponding bump locations. The interconnects 247 connecting to the UCIe interfaces are the UCIe channel within the interposer. The interconnects 245 may travel along different routing layers 240, connected by vias 245.

Now consider each of the tasks shown in FIG. 1 in more details.

Interposer description (105). Interposer connectivity is defined by the bump locations and nets to be routed through the interposer between bump locations. In the following disclosure, signal nets are nets that carry signals, such as data or control signals, rather than power or ground. For UCIe, each signal net connects two corresponding bump locations, which connect to the corresponding pins for the UCIe interfaces 212 on the dies 210.

Interposer connectivity may have the following characteristics:

Many inter-die signal nets. A majority of the signal nets may be inter-die nets. Inter-die nets typically are also longer. For example, in some cases, a majority of the interconnects in the interposer have lengths that are at least 50% of the die width, say 10 mm for a 20 mm wide die.

Dense routing. There may be a very large number of routes implemented, to the extent that almost all interposer area is used by signal routing, PG (power and ground) distribution and shielding. The ratio of routes to be implemented to the number of routes possible may be close to 100 percent, for example 90 percent or 95 percent or more.

Length-matched routes. A significant subset of inter-die nets may have a length-matching requirement. For example, 50 percent or 90 percent or more of the signal nets may have a length matching constraint. The high speed of the UCIe main band may result in a length matching constraint for those interconnects. Two nets are length-matched if the interconnect path between their endpoints has the same length within some tolerance. Same wire-length roughly translates to approximately zero or minimum skew delay for an inter-die interface.

Co-axial shielding. Given the length of inter-die connections, signal integrity requirements may dictate that signal routes be shielded on all four sides. This means shielding on both sides of the metal layer used for routing and also on the metal layer track both directly above and directly below the signal route.

Reduced number of vias and route jogs. The interposer die 220 may be large, up to several 10s of the size of dies 210. Hence, to maintain high interposer yield, the number of vias used as well as the average number of jogs per interconnect may be reduced. For this reason, single-layer routing is preferred. In some interposers, 90 percent or more of the signal nets are routed within a single routing layer.

The UCIe standard defines a base element, called D-word. There are two groups of signal nets: faster main band signals and slower side band signals. There are 8 side band signals and up to 148 main band signals in a D-word. These two bands of signals operate at frequencies that are more than one order of magnitude different. The main band operates at up to 16 Gbps and the side band operates at 800 MHZ.

UCIe identification (110). An interposer may route various components besides UCIe interfaces. At 110, the UCIe channel within the interposer is detected. Characteristics of the UCIe channel may also be derived based on the channel identification result. These may include channel orientation, pitch of the bump locations, and number of D-word elements.

A UCIe channel implements signal connection and data transfers between two dies. Therefore, it primarily contains two-pin nets: nets that connect cluster(s) of bumps of one die to corresponding cluster(s) of bumps of another die. The bump clusters within a die will be located close to each other within the bump array for that die, but corresponding bump clusters on the two dies are separated because the two dies are separated. In addition, the bump locations may be placed in regular patterns within a bump cluster. Accordingly, the bump locations and the net-bump assignments (which nets connect which bumps) may be used to identify a UCIe channel from among the many bump locations and nets for the interposer.

Figure 3:
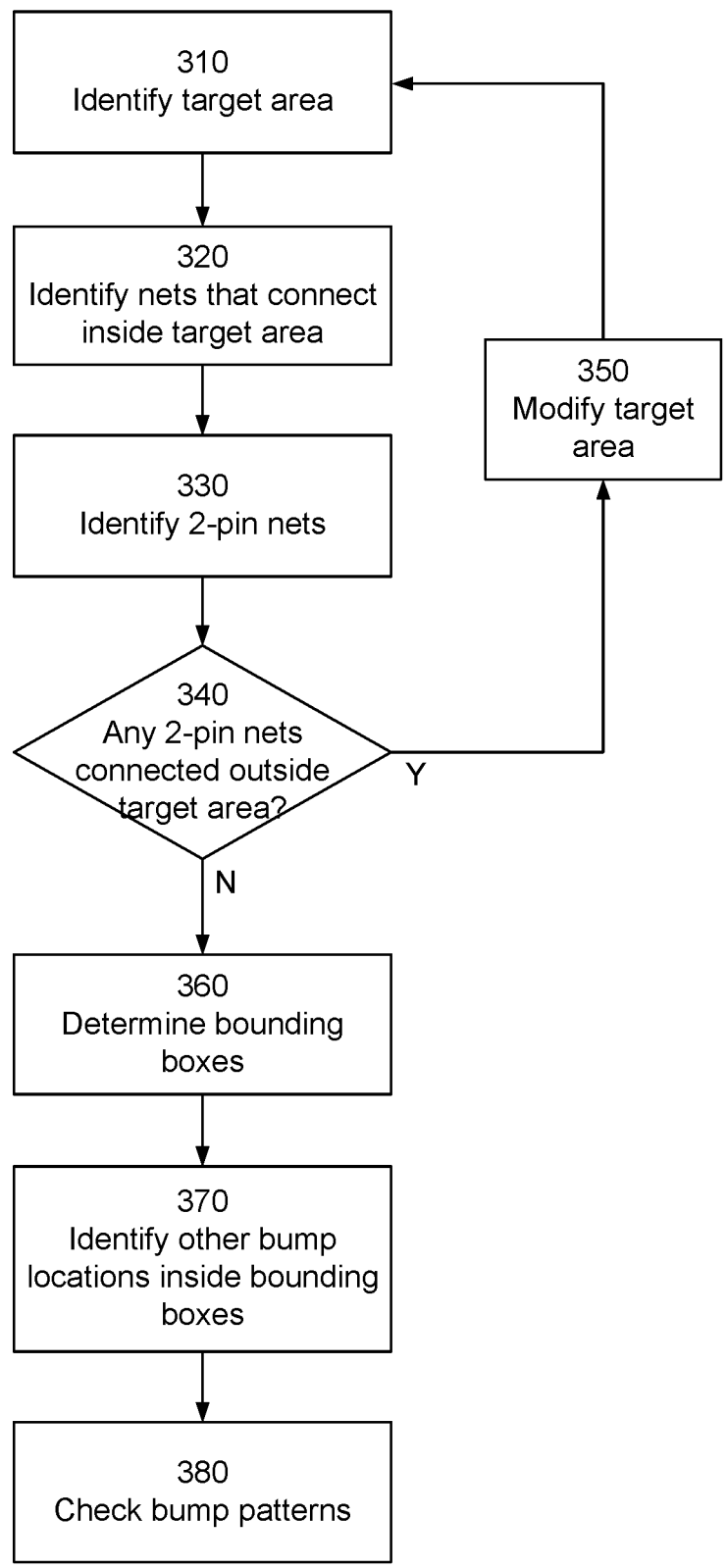
FIG. 3 is a flow diagram for identifying a UCIe channel in an interposer, in accordance with some embodiments of the present disclosure.

FIG. 3 is a flow diagram for identifying a UCIe channel in an interposer, in accordance with some embodiments of the present disclosure. At 310, a user identifies a target area which contains a UCIe channel. The target area may be the entire interposer. At 320, all nets that connect to a bump location within the target area are identified. At 330, from among these nets, the 2-pin nets are identified. These are nets that only provide point-to-point connections from one bump location to another bump location. For example, a bus that distributes data to many bump locations is not a 2-pin net. At 340, if any 2-pin net connects to a bump location outside the target area, an error is reported. At 350, the user may modify the target area to include both pins of the 2-pin net. Otherwise, at 360, bounding boxes are determined for the 2-pin nets for each die. An individual 2-pin net connects a bump location on one die to a bump location on another die. A bounding box is drawn for the bump locations on the one die and a separate bounding box is drawn for the corresponding bump locations on the other die. As a result, each 2-pin net should have one bump location inside a bounding box for one die and the other bump location inside a bounding box for the other die. At 370, other bump locations that happen to fall inside the bounding boxes are also identified. At 380, the bump locations are analyzed to ensure that bump patterns do not violate the UCIe standard. For example, misalignment of bumps may be detected. The orientation of the UCIe channel on the interposer, namely vertical or horizontal, may also be derived based on the bump-net assignments.

Subchannel partition (120). Once the bump locations for a UCIe channel are identified, the bump locations and nets are partitioned into groups called subchannels. Subchannels have the following properties. Each subchannel contains two corresponding clusters of bump locations: one cluster of bump locations from one die and a corresponding cluster from the other die. The subchannel also includes a region that connects the two corresponding clusters. This region provides some initial planning for inter-die routing between corresponding clusters. The bounding boxes of the subchannels do not overlap. The term "bounding box" does not imply that the bounding box must be rectangular in shape. If there is PG pre-routing on the signal routing layers, they are located outside the bounding boxes. Any main band signal is contained within a single subchannel. That is, the two bump locations for each main band signal are in the same subchannel.

Figure 4A:
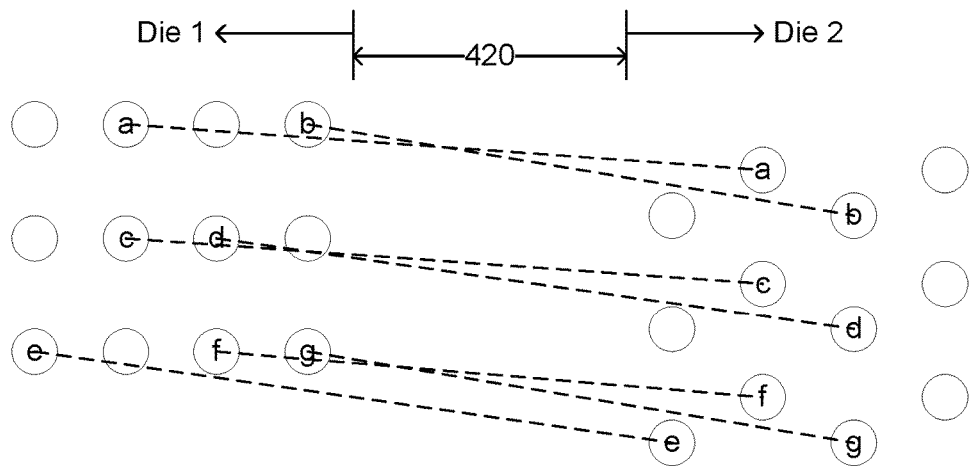
FIGS. 4A and 4B show an example of partitioning a UCIe channel into subchannels, in accordance with some embodiments of the present disclosure.
Figure 4B:
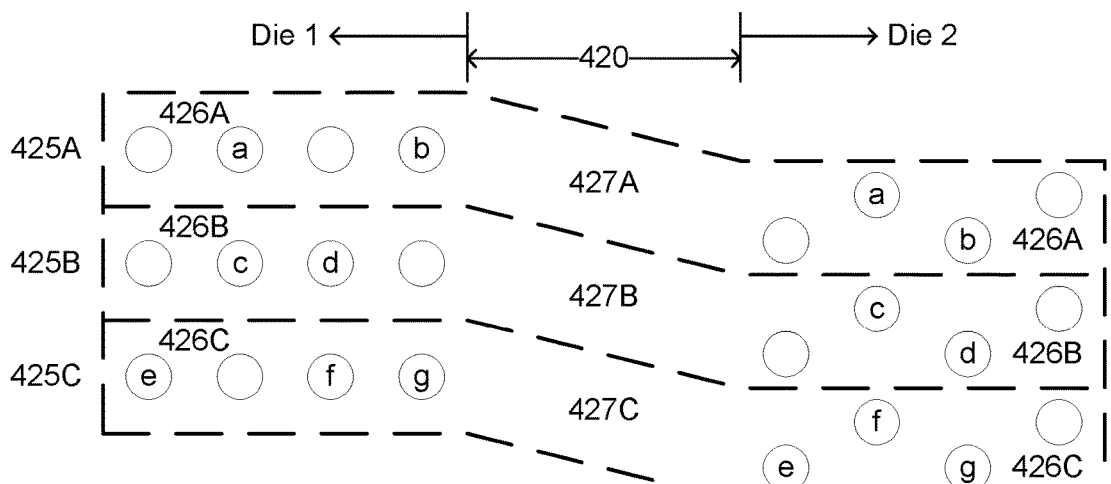

FIGS. 4A and 4B show an example of partitioning a UCIe channel into subchannels, in accordance with some embodiments of the present disclosure. FIG. 4A shows bump locations for two dies: die 1 and die 2. The bump arrays for the two dies are separated by an area 420 which may be referred to as the inter-die routing area. The 12 circles on the lefthand side of FIG. 4A are 12 bump locations from the bump array of die 1, and the 12 circles on the righthand side are 12 bump locations from the bump array of die 2. The bump locations for the UCIe main band are labeled with letters, and corresponding bump locations on the two dies are labeled with the same letter. Bump location "a" on die 1 is connected to the corresponding bump location "a" on die 2, as indicated by the dashed line connecting the two bump locations. These two bump locations are referred to as die 1/bump location a and die 2/bump location a, respectively. The unlabeled bump locations are not used for the UCIe main band. They may be for the side band, they may be for power and ground, they may be unused, or they may be for other purposes.

FIG. 4B shows a partition into three subchannels 425A, B,C, as outlined by the heavy dashed lines. Each subchannel 425A,B,C includes corresponding clusters 426A,B,C of bump locations, and a portion 427A,B,C of the inter-die routing area connecting the clusters. Cluster 426A includes die 1/bump locations a and b, and corresponding cluster 426A includes die 2/bump locations a and b. Subchannel 425A includes the bump clusters 426A and inter-die region 427A. Cluster 426B includes die 1/bump locations c and d, and so on. The bounding boxes for the subchannels 425A, B,C do not overlap. The bounding box for each subchannel includes three sections: one for the cluster of bump locations on die 1, one for the cluster of bump locations on die 2, and one for the routing between the two bump clusters.

In this example, the UCIe channel is horizontally-oriented because the displacements between corresponding bump locations on dies 1 and 2 are primarily along the horizontal direction. Accordingly, the bump clusters are also horizontally-oriented. Here, they are horizontal bands of bump locations. They are rows rather than columns. In other situations, the UCIe channel may be vertically-oriented or oriented at an angle, and the bump clusters may be similarly oriented.

Because the bump clusters 426 are horizontally-oriented and do not overlap, the UCIe routing area 420 may be subdivided into routing regions 427 that connect the corresponding bump clusters. These routing regions 427A,B,C also do not overlap for the main band signals. Accordingly, each subchannel may be routed independently of the others. The bump locations in clusters 426A may be routed through inter-die region 427A, and so on. In some cases, it is preferable to partition the UCIe main band into as many subchannels as possible. If the main band contains 148 signals, it is easier to route 40 subchannels of 3-4 signals each, rather than 5 subchannels of 25-35 signals each.

If the UCIe channel cannot be partitioned into subchannels, an error may be reported. This may be caused by an assignment of nets to bumps that makes crossing subchannels unavoidable. The user may reassign nets to bumps to avoid the crossing of subchannels.

Band partition (130). The UCIe standard defines two categories of signals. The flow of FIG. 1 routes the entire UCIe channel, but different routing methods and constraints are applied to the two categories. Specifically, the main band signal may be routed using a larger spacing on the interconnects than those used for the side band signals. Therefore, more routing resource can be used for main band signals to meet their high-speed requirement. Optionally, the flyline distances between corresponding bump locations for the main band signal may be checked. The variations of the flyline distance may be required to be less than some threshold in order to ensure length-matching of the interconnects for the main band signals. Such a restriction may not be enforced for side band signals, due to their laxer requirements.

Different methods can be used to determine the side band signals versus the main band signals. First, names of the nets can be used. Second, the net-bump assignments can be used. The outlier nets from the flyline length analysis, which have much longer flylines, may be classified as side band signals. Third, a user can provide the names of the side band signals or the main band signals. For each D-word of the advanced UCIe interface with 156 signals, the side band contains 8 signals and the remaining signals (up to 148) are in the main band.

Power and ground (PG) track placement (140). The subchannels provide some preliminary planning for the routing of the signal bands. In order to ensure sufficient area for PG distribution, PG tracks may be placed before completing the routing of signal nets. In this approach, PG tracks provide some base structure for the PG distribution, with local stubs connecting to the PG tracks. PG tracks may have the same orientation as the UCIe channel.

Figure 5:
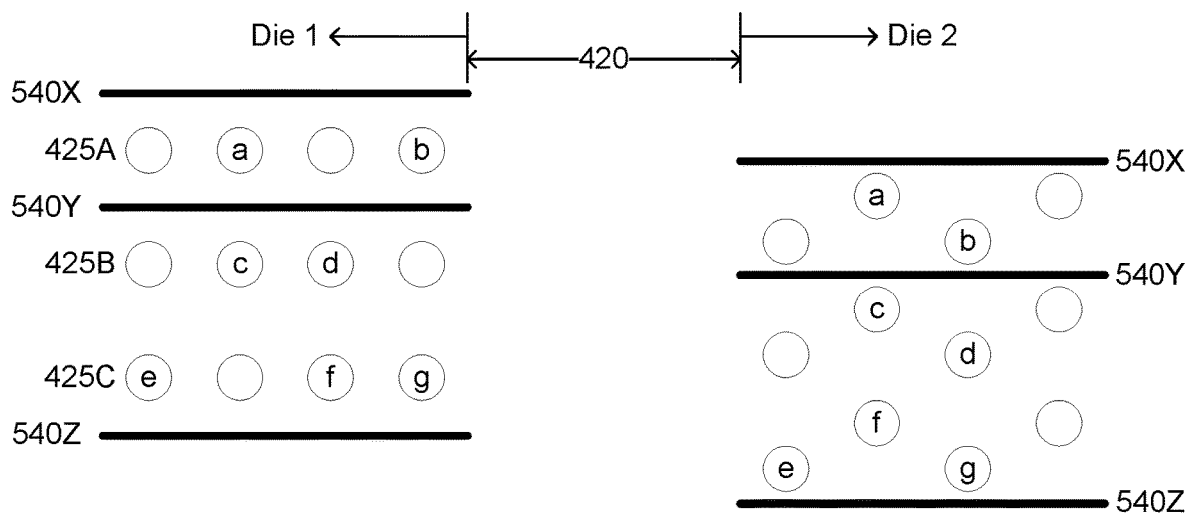
FIG. 5 shows placement of power and ground tracks, in accordance with some embodiments of the present disclosure.

FIG. 5 shows placement of PG tracks, in accordance with some embodiments of the present disclosure. The PG tracks are labeled as 540X,Y,Z. Using the subchannels from FIG. 4B, the PG tracks 540 are placed at the boundaries of the bump subchannels 425A,B,C. The width and number of PG tracks are determined based on power analysis of the UCIe interface to meet the IR drop requirement. There may be a one-to-one mapping of PG tracks for each die. That is, for each PG track placed for the bump locations of die 1, there is a corresponding PG track placed for the bump locations of die 2. In FIG. 5, corresponding PG tracks 540 are labeled by the same letter. There can be multiple subchannels between two adjacent PG tracks. In FIG. 5, subchannels 425B,C are contained in the region between PG tracks 540Y,Z. The PG tracks may be placed on routing layers separate from the layers used for signal routing.

Signal route planning (150). The PG tracks divide the UCIe routing area into multiple non-overlapping regions, each of which can contain one or more subchannels. A signal route planning step is conducted. Signal routing is performed for each subchannel separately. The main band signals are processed first. For each bump cluster, stubs are placed at the boundary of the bump cluster for all main band signals in the subchannel. These stubs are routed to the corresponding bump locations, for example using customer specified routing rules. In other words, as a first step, bump locations for main band signals are routed to the edges of the individual clusters. In addition to this intra-die routing, the width of all routes in a subchannel may be minimized.

Figure 6A:
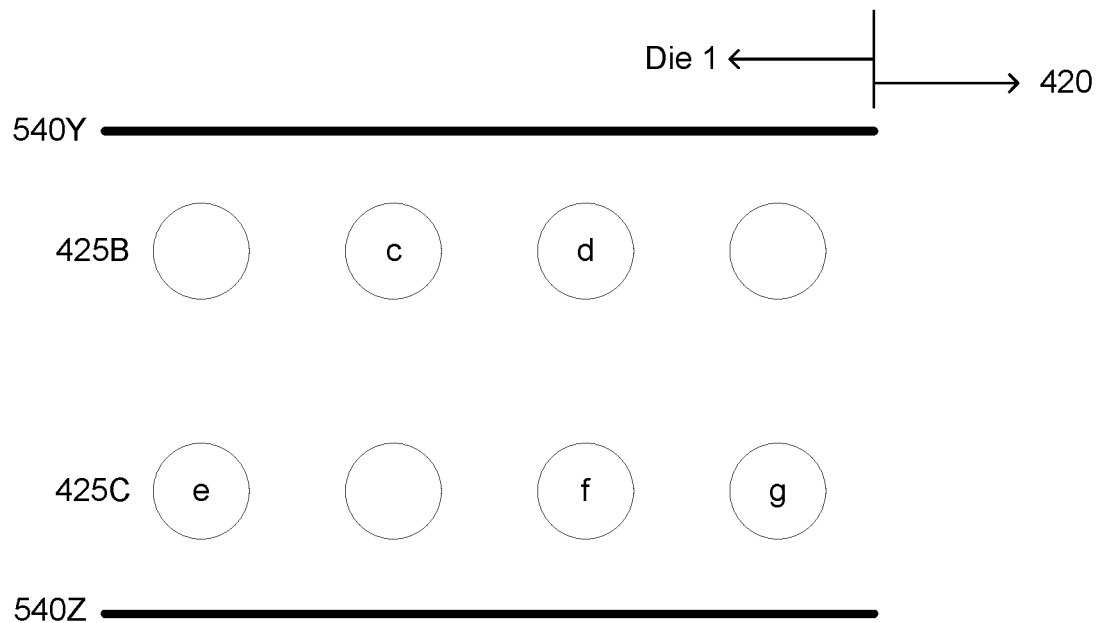
FIGS. 6A and 6B show an example of intra-die routing within a bump cluster, in accordance with some embodiments of the present disclosure.
Figure 6B:
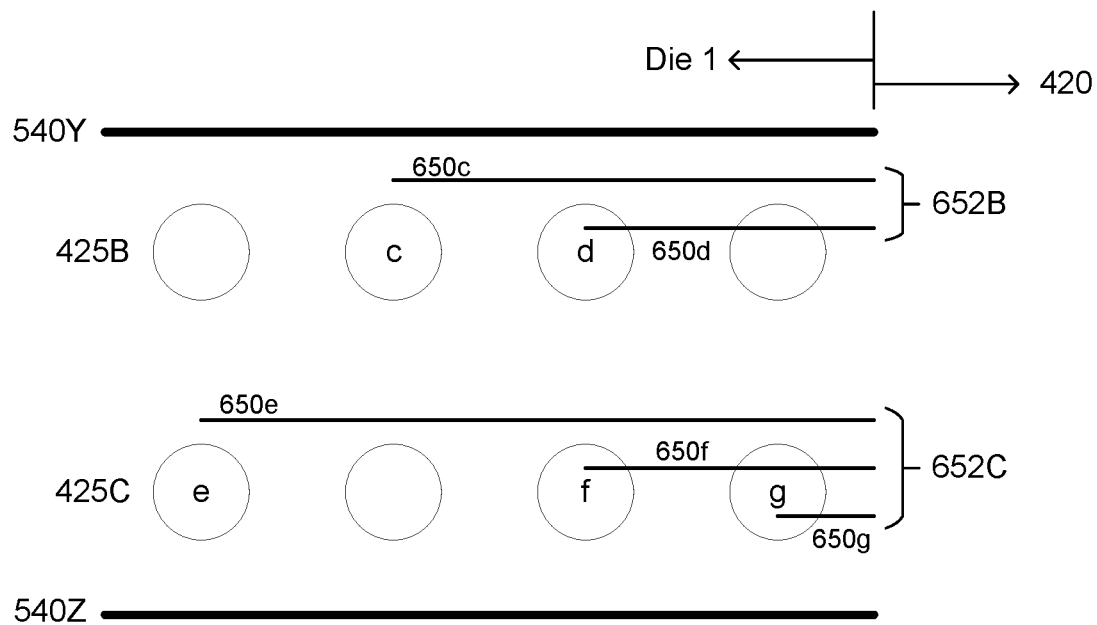

FIGS. 6A and 6B show an example. FIG. 6A shows two bump clusters 425B,C from FIG. 5 and the surrounding PG tracks 540Y,Z. Cluster 425B contains two bump locations c,d for main band signals, and cluster 425C contains three bump locations e,f,g for main band signals. These bump locations are routed to the edges of the respective bump clusters, as shown in FIG. 6B. For clarity, only the horizontal interconnect sections 650c-g are shown in FIG. 6B. Interconnect 650c connects bump location c to the edge of cluster 425B, interconnect 650d connects bump location d to the cluster edge, and so on. These interconnects 650 are located on a different interposer layer than the bump locations so they are not shorting to bump locations even though FIG. 6B shows bump locations and interconnects as overlapping. Short vertical interconnects and vias (not shown in FIG. 6B) may be used to connect the bump locations to the interconnects 650 shown.

The routing result of each subchannel forms a tab 652B,C of interconnect stubs. The interconnects for main band signals within each cluster are densely packed, with gaps between the clusters for the routing of side band signals. In FIG. 6B, there is a gap between tabs 652B and 652C to allow for side band signals or other routing. If this routing cannot fit in the space between PG tracks 540, the location of the PG tracks may be adjusted, iterating between tasks 140 and 150 of FIG. 1. Conversely, if this routing results in a lot of unused space between the PG tracks, the routing spacing within each cluster may be increased. Increasing the routing spacing improves signal quality. If the initial routing results in routing violations, the routing may be modified to fix the violations.

Inter-die routing (160). Signal routing between the two dies is performed in two steps. First, the main band signals are routed using the stub locations from the previous planning step. In FIG. 6B, the interconnects 650c,d in tab 652B of die 1 are routed to the corresponding tab on die 2. For inter-die routing, the route spacing D of individual nets may be adjusted based on local congestion and impact on overall routing result.

Figure 7:
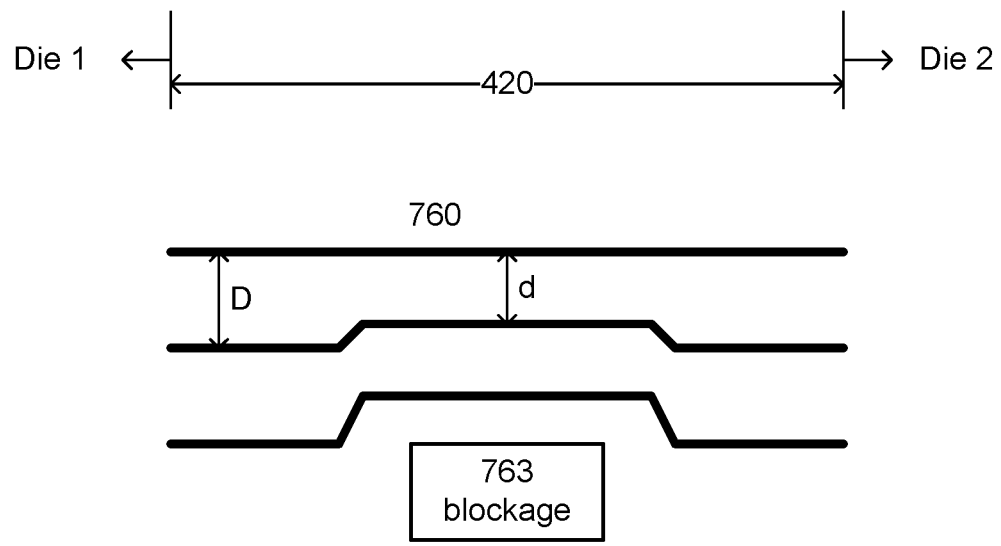
FIG. 7 shows modification of route spacing of inter-die routing, in accordance with some embodiments of the present disclosure.

FIG. 7 shows an example. The inter-die interconnects 760 for the main band signal connect dies 1 and 2. On each side, these interconnects 760 connect to the tabs for the corresponding bump clusters. In the inter-die region 420, these interconnects 760 must route around an existing blockage 763. A smaller route spacing d<D can be used to route around the blockage.

The side band signals are routed after routing of the main band signals, possibly using a different route spacing. In this approach, the performance of the main band signals is prioritized.

Signal shielding (170). UCIe signals use shielding to reduce signal interference, such as crosstalk, which degrades the signal transfer reliability. Shielding may be considered during the signal routing step. Specifically, wide spacing rules are honored so that shielding wires can be inserted between the signal interconnects. Shielding can be created on available layers chosen by users using user-specified shielding rules.

PG bump routing (180). After signal shielding, the remaining PG routing is completed. One approach creates a PG mesh and connects PG bumps to the mesh. In addition, the shielding interconnects are tied to the PG mesh.

PG construction can be different on signal routing layers and non-signal-routing layers. On the signal routing layers, signal interconnects and shielding occupy most of the area. Only empty areas are filled with PG routing.

Figure 8:
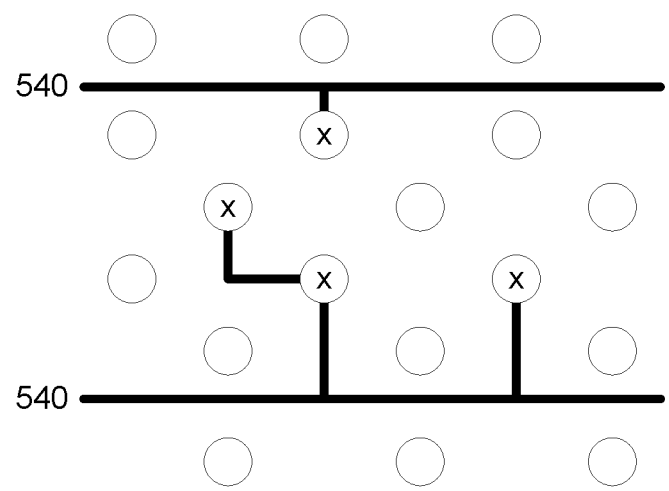
FIG. 8 shows completion of a power and ground network, in accordance with some embodiments of the present disclosure.

On the non-signal-routing layers, routes are added to connect PG vias to PG tracks as shown in FIG. 8. In FIG. 8, PG tracks 540 were placed in task 140. The circles with X's are PG vias, and the other circles are other vias such as signal vias. The PG vias are connected to the PG tracks by local stubs. The PG mesh is created by adding PG routes perpendicular to the UCIe channel orientation, which is vertically in FIG. 8. Finally, vias are added to tie shielding routes to the PG mesh.

When there are multiple power and ground domains, if PG routing cannot be completed due to the existence of shielding structures, some shielding structures can be removed or modified to create passage for PG routing, iterating between tasks 170 and 180 of FIG. 1.

Figure 9:
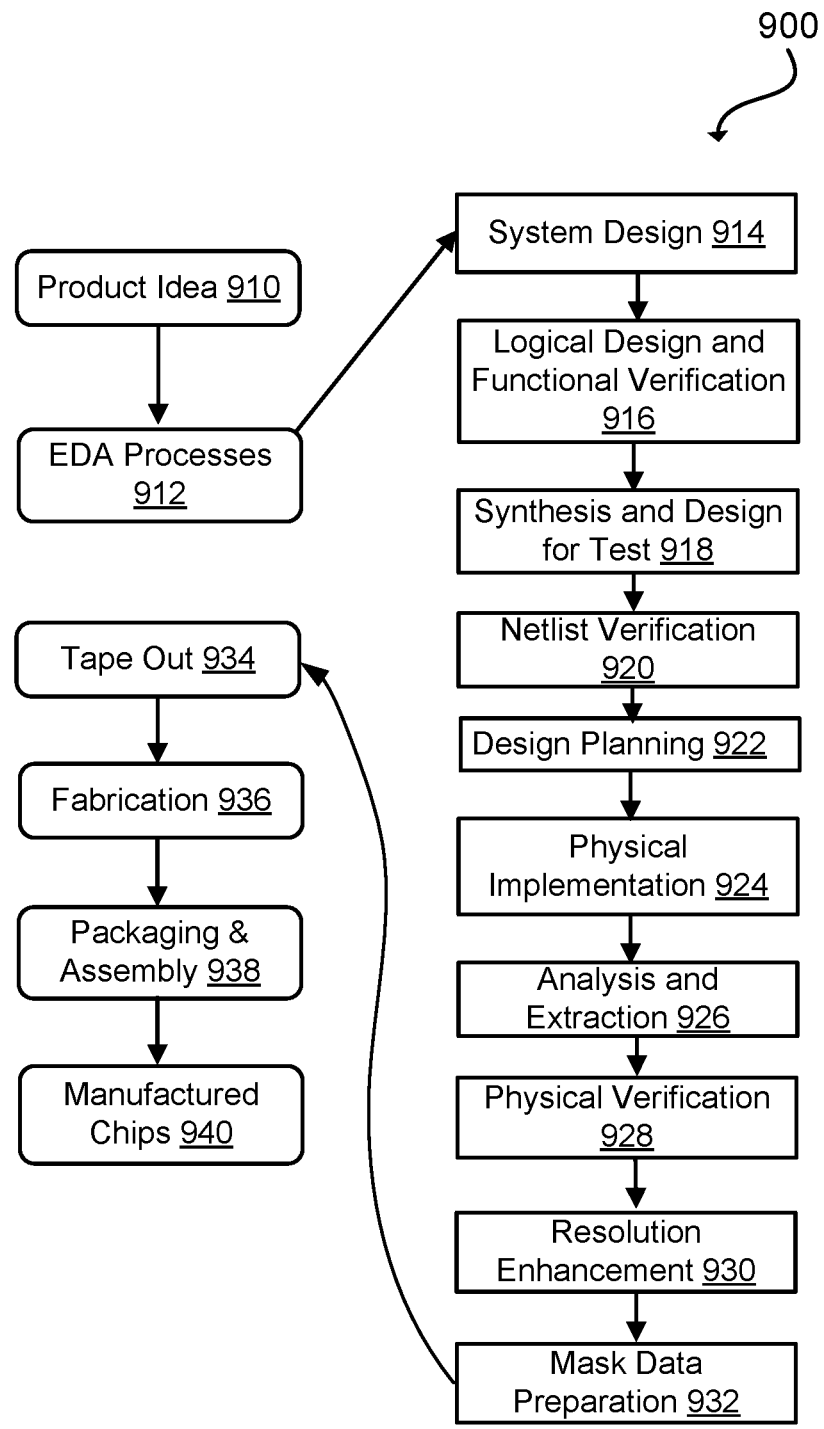
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 9. The processes described by be enabled by EDA products (or EDA systems).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
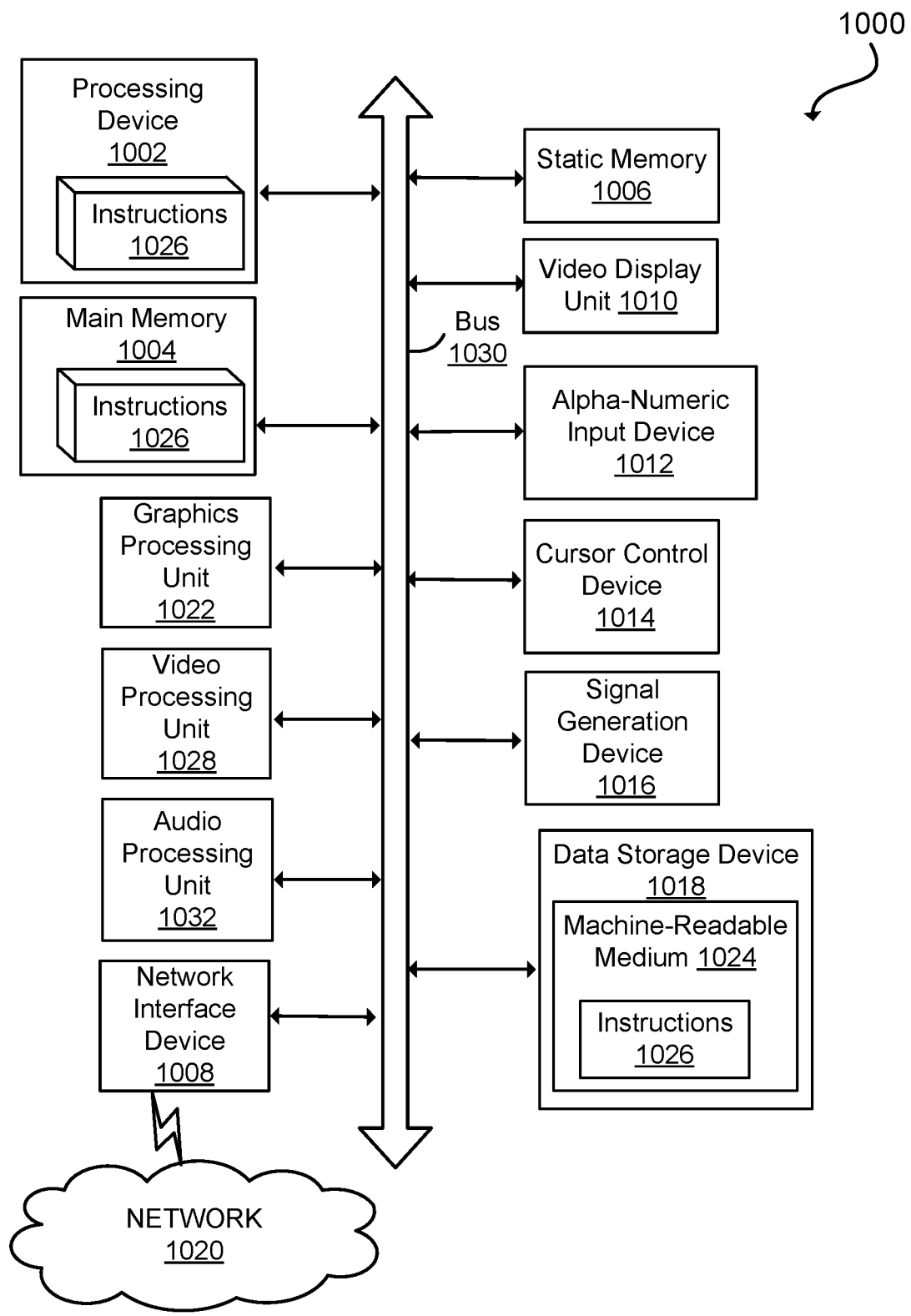
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving a description of a plurality of bump locations and nets for an interposer;
   identifying a Universal Chiplet Interconnect Express™ (UCIe) channel from among the plurality of bump locations and nets within the interposer; wherein the UCIe channel within the interposer comprises first bump locations for a first UCIe interface to the UCIe channel on a first die, second bump locations for a second UCIe interface to the UCIe channel on a second die, and nets connecting corresponding first and second bump locations for the two UCIe interfaces on the two dies;
   partitioning, by a processing device, the UCIe channel into subchannels, wherein the subchannels comprise corresponding clusters of first and second bump locations connected by the nets, and bounding boxes for the subchannels are non-overlapping; and
   for each subchannel, routing the nets within the subchannel.

2. The method of claim 1, wherein the clusters of bump locations are horizontally-oriented or vertically-oriented bands of bump locations.

3. The method of claim 1, wherein the UCIe channel is oriented along a predominant direction, and the clusters of bump locations are bands of bump locations also oriented along the predominant direction.

4. The method of claim 1, wherein routing the nets within each subchannel comprises:
   intra-die routing from the bump locations within individual clusters to edges of the individual clusters; and
   inter-die routing between the edges of corresponding clusters.

5. The method of claim 1, wherein pre-routing of power and ground for the interfaces is located outside the clusters.

6. The method of claim 1, wherein identifying the UCIe channel comprises:
   determining whether nets are two-pin nets; and
   determining whether bump locations are placed in regular patterns within the clusters.

7. The method of claim 1, further comprising:
   adding signal shielding for the routed nets.

8. The method of claim 4, wherein intra-die routing from the bump locations within individual clusters to edges of the individual clusters comprises:
   routing from the bump locations for a main band signal of the UCIe channel to the edge of the individual cluster; and adjusting the routing for the bump locations for main band signals within the individual cluster, comprising at least one of: moving the routing for main band signals to reduce unused space within individual clusters, and moving the routing for main band signals to create routing alleys for side band signals within individual clusters.

9. The method of claim 4, further comprising:
prior to intra-die routing, placing tracks for a power and ground (PG) network outside the clusters.

10. An integrated circuit system comprising:
a first die that includes a first Universal Chiplet Interconnect Express™ (UCIe) interface;
a second die that includes a second UCIe interface;
an interposer supporting the two dies and containing a UCIe channel between the two UCIe interfaces on the two dies, the UCIe channel comprising:
first bump locations that connect to the first UCIe interface on the first die; second bump locations that connect to the second UCIe interface on the second die; and
interconnects connecting corresponding clusters of first and second bump locations for the two UCIe interfaces on the two dies; wherein the UCIe channel is partitioned into and laid out according to subchannels that contain corresponding clusters, bounding boxes for the subchannels are non-overlapping; and the interconnects within each subchannel comprise:
interconnects from the bump locations within individual clusters for a main band signal of the UCIe channel to edges of the individual clusters; and
interconnects between the edges of corresponding clusters.

11. The interposer of claim 10, further comprising a power and ground (PG) network comprising:
PG bump locations interspersed within the clusters;
PG tracks located outside the clusters; and
PG stubs connecting the PG bump locations to the PG tracks.

12. The interposer of claim 10, wherein interconnects comprise main band interconnects that carry UCIe main band signals and side band interconnects that carry UCIe side band signals, and the main band interconnects have a wider spacing than the side band interconnects.

13. The interposer of claim 11, wherein the interconnects connecting corresponding clusters of first and second bump locations are on a different layer of the interposer than the PG tracks, and the interposer further comprises vias connecting the PG tracks to the PG stubs.

14. A non-transitory computer readable medium comprising stored instructions, which when executed by a processing device, cause the processing device to:
receive a description of a Universal Chiplet Interconnect Express™ (UCIe) channel within an interposer, the description comprising bump locations for a first UCIe interface on a first die, bump locations for a second UCIe interface on a second die, and nets connecting corresponding bump locations for the two UCIe interfaces on the two dies;
identify the bump locations and nets for a main band of the UCIe channel and for a side band for the UCIe channel; and
route the nets for the main band and also route the nets for the side band as parts of a single flow for routing the UCIe channel, but using separate routing processes within the single flow.

15. The non-transitory computer readable medium of claim 14, wherein identifying the bump locations and nets for the main band is based on lengths of flylines between corresponding bump locations for the two UCIe interfaces on the two dies.

16. The non-transitory computer readable medium of claim 14, wherein routing the nets for the main band occurs before routing the nets for the side band.

17. The non-transitory computer readable medium of claim 14, wherein the instructions further cause the processing device to:
identify the bump locations for a power and ground (PG) network for the UCIe interfaces; and
route the PG network to the PG bump locations as part of the single flow for routing the UCIe channel, but using a routing process separate from the routing processes for the main band and for the side band.

18. The non-transitory computer readable medium of claim 17, wherein the routing process for the main band has higher priority than the routing process for the side band.

* * * * *